Patented Sept. 19, 1933

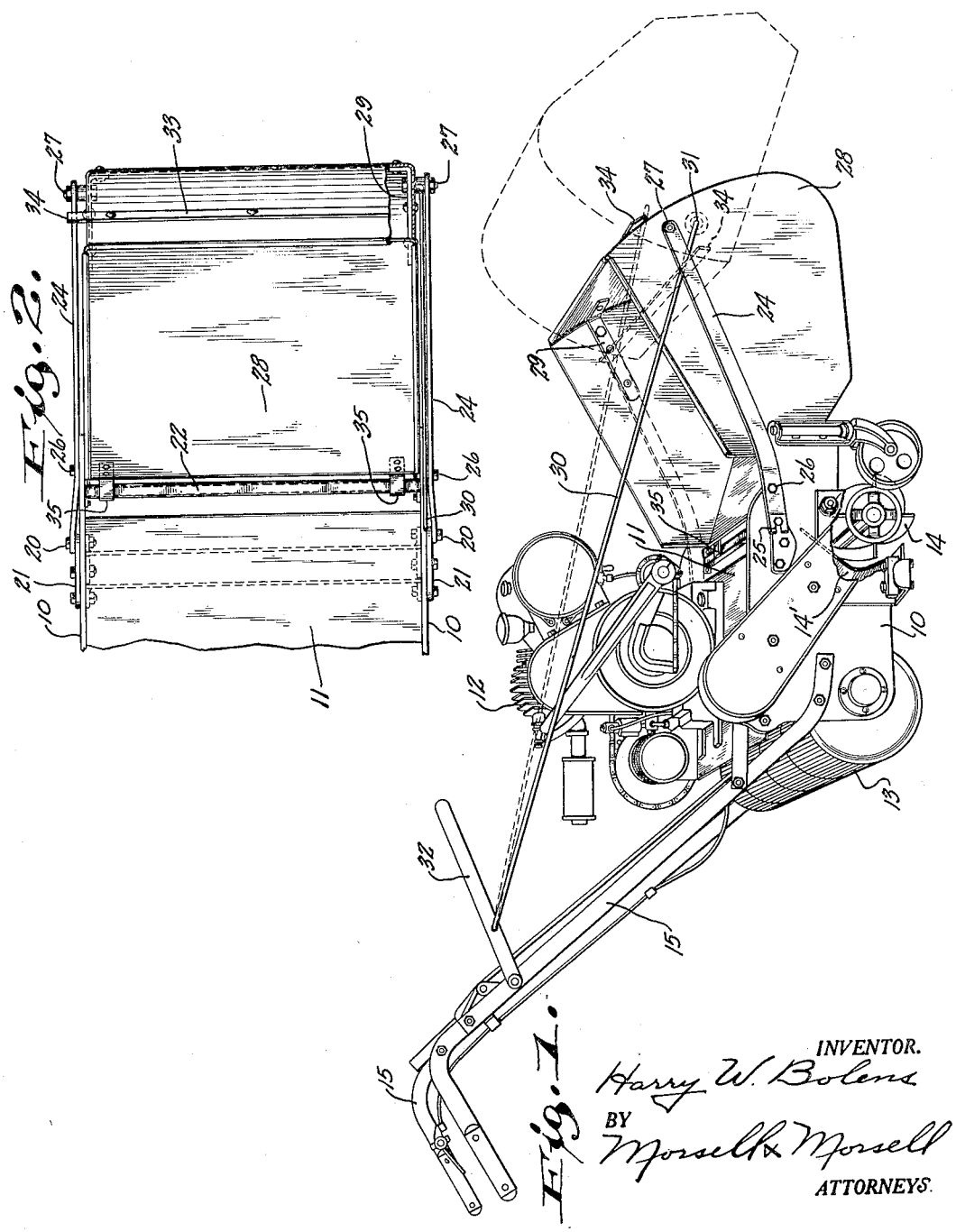

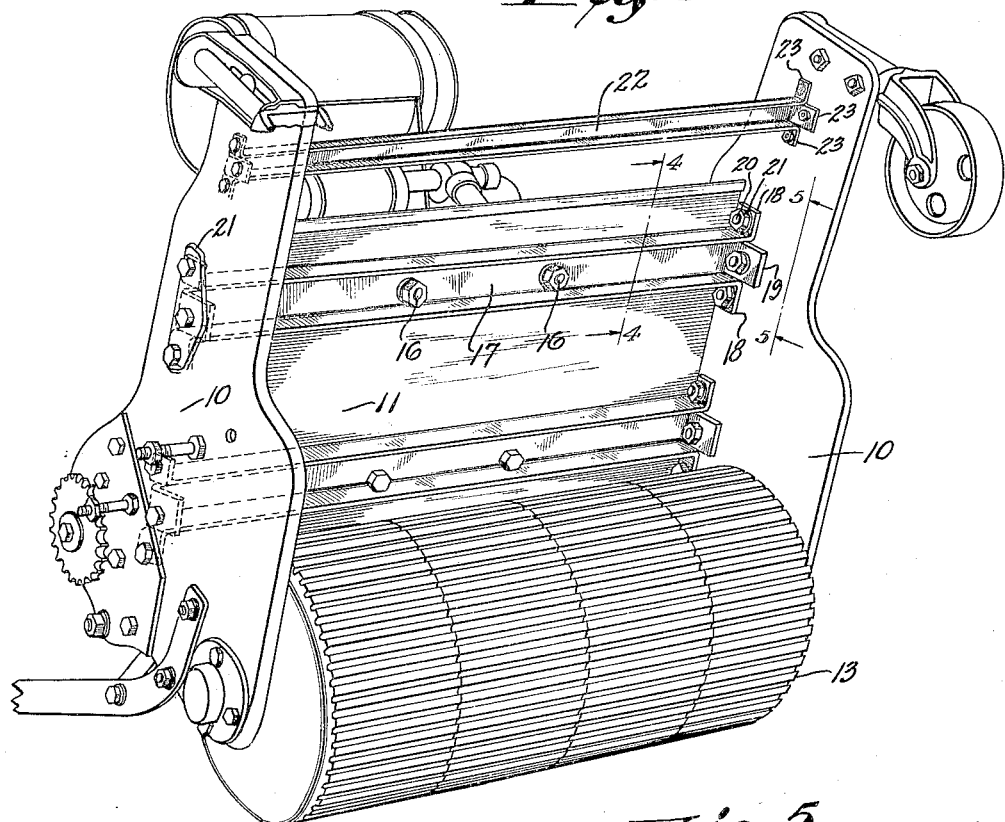

1,927,152

UNITED STATES PATENT OFFICE 1,927,152

MOWER AND THE LIKE

Harry W. Bolens, Port Washington, Wis.

Application February 16, 1931. Serial No. 515,929

7 Claims. (Cl. 56—200)

This invention relates to improvements in mowers and the like.

Heretofore, in the use of mowers having grass catching receptacles in connection therewith, it has been necessary to manually detach the receptacles in order to dump the contents thereof. Inasmuch as the grass catcher is quickly filled during use of a mower, the frequent dumping which is rendered necessary in troublesome to the operator.

It is, therefore, one of the objects of this invention to provide a mower having a grass receptacle, in which simple mechanism is provided for inverting the receptacle while it is in connection with the mower, said mechanism also providing for the return of the receptacle to its normal position.

A further object of this invention is to provide a mower having an invertible grass catching receptacle in which the dumping movement of the receptacle can be readily controlled from a convenient point adjacent the handles of the mower.

A further object of this invention is to provide a mower having an invertible receptacle in which movement of the receptacle to dumping position and the return thereof is positively controlled by means of rigid operating levers.

A further object of this invention is to provide a mower having an invertible grass catching receptable, in which the receptacle is provided with a stop for effectively limiting movement during dumping and with an additional stop for limiting return movement and for maintaining the open end of the receptacle in proper position for intercepting grass during use of the device.

A further object of this invention is to provide a mower or the like in which the motor platform is reinforced and supported by channel members to effectively prevent sagging of the platform under the weight of the motor, said channel members also being constructed in a novel manner to provide a firm connection with the frame which will resist the loosening effects of motor vibration.

With the above and other objects in view, the invention consists of the improved mower or the like and all its parts and combinations as set forth in the claims, and all equivalents thereof.

In the accompanying drawings illustrating one complete embodiment of the preferred form of the invention in which the same reference numerals designate the same parts in all of the views:

Fig. 1 is a perspective view of a mower, the dotted lines indicating the grass catcher in inverted position;

Fig. 2 is a plan view of the grass catcher showing it in connection with a portion of the mower, parts being broken away;

Fig. 3 is an enlarged perspective view showing the novel construction for supporting the motor platform, parts of the motor being omitted and parts being broken away;

Fig. 4 is an enlarged detail sectional view taken on line 4—4 of Fig. 3;

Fig. 5 is an enlarged detail sectional view taken on line 5—5 of Fig. 3;

Fig. 6 is a view similar to Fig. 5 showing a modified form of construction; and

Fig. 7 is a sectional view taken on line 7—7 of Fig. 6.

Referring to the drawings the mower in general is of usual construction and embodies a pair of spaced-apart side plates 10 between which there is a supporting platform 11 for a motor 12 and associated mechanism. A traction roller 13 which is rotatably mounted between the side plates 10 is driven by suitable connections with the motor 12. A cutting reel 14 is also journaled between the side plates and is also driven by suitable connections with said motor. A pair of spaced-apart guiding handles 15 extend obliquely upwardly from the side plates and provide a means for guiding the mower in its movement. A curved grass deflector plate 14' is preferably positioned behind the cutting reel.

Inasmuch as the motor supporting platform 11 has to hold considerable weight, and inasmuch as it is subjected to constant vibrations from the motor, it is essential that a firm means be provided for supporting said platform. Referring to Figs. 3, 4 and 5 it will be seen that the platform is secured by means of bolts 16 to channel shaped cross pieces 17. Said cross pieces have their end portions suitably slit and bent to form laterally extending flanges 18 and a downwardly extending flange 19, all of said flanges being integral with the channel. The said flanges are suitably perforated for receiving bolts 20, the said bolts extending through plates 21 mounted on the outer side of the mower side plates 10, through the side plates, and through the flanges, there being nuts 21 threaded on the ends of the bolts. With this construction a three-point connection is provided at each end of each cross piece and thus the cross pieces are rigidly secured so as to offer the maximum resistance to loosening caused by vibration. It is further to be noted that due to the channel shape of the cross pieces the motor supporting platform is effectively prevented from sagging. This latter condition occurred frequently in devices formerly constructed and embodying rods for supporting the platform.

A similarly formed channel 22, of less width, is mounted between the side plates 10 adjacent one end thereof for a purpose to be hereinafter described. Said channel also has its ends flanged as at 23 to form a three-point connecting means. In the modified form of construction illustrated in Figs. 6 and 7, the slitting and bending of the ends of the channels is eliminated, and a T-shaped casting 18' is inserted at each end of each channel, said casting being secured to the channel by bolts 19' or the like, and being secured at three points to the side plates 10 by the bolts 20 the same as in the principal form.

Supporting arms 24 having their inner ends slotted as at 25 are connected to the side plates of the mower by having the slots embrace one of the bolts 20, and by means of an additional bolt 26 which extends through each arm a short distance from its inner end. The said arms project forwardly and slightly upwardly from the front of the mower and have their outer ends provided with apertures for receiving pivot bolts 27. Said bolts extend through the sides of a grass catching receptacle 28. The interior of said receptacle is provided with angular reinforcing pieces 29 and the pivot bolts 27 extend through said pieces to form a reinforced bearing. A rod 30 has its outer end inwardly bent and extending through an aperture 31 therefor in one side of the receptacle. Said aperture is located a short distance below the pivot bolt 27. The inner end of the rod 30 is pivotally connected to a lever 32 and said lever is in turn pivoted to one of the handles 15 of the mower in a convenient position for manual operation.

A cross piece 33 which extends across the front of the grass catcher 28 has its ends projecting outwardly beyond the sides of the receptacle to form stops as at 34. Other stops 35 project inwardly from the inner portion of the receptacle and normally rest on the cross piece 22 of the mower to hold the open end of the receptacle 28 in a proper position for intercepting grass during use.

In operation, when it is desired to empty the contents of the grass catching receptacle 28, the lever 32 is pulled upwardly, which through the rod 30 will cause an upward pivoting of the receptacle. When the receptacle has passed the dead center the lever is released again and the bucket will lower itself to the dotted line position shown in Fig. 1, the projecting stops 34 engaging the lower edges of the supporting bars 24 to limit the turning movement. To return the bucket to the original position the lever is again operated in a similar manner and the bucket will assume the position shown by full lines in Fig. 1 with the stops 35 resting upon the cross piece 22 to limit downward movement of the inner end of the receptacle. With this arrangement a very simple and positive control is provided, said control being practically fool proof.

As before mentioned, the channel shaped cross members 17 on which the motor platform is mounted form a very desirable construction which prevents sagging and which provides a rigid connecting means with the mower side plates 10.

Although the invention has been shown and described more particularly in connection with power mowers, it is to be understood that certain features therein are capable of other adaptations. It is further to be understood that all changes and modifications are contemplated as may come within the scope of the claims.

What I claim is:

1. In combination, a mower having a frame provided with grass cutting mechanism, a pair of fixed supporting arms extending forwardly of said grass cutting mechanism from the frame, a grass catching receptacle pivotally carried by said supporting arms in a position forwardly of the grass cutting mechanism, and means operable from a position rearwardly of the grass cutting mechanism for causing pivotal movement of the receptacle to dump the contents thereof.

2. In combination, a mower having a frame provided with grass cutting mechanism, supporting means extending forwardly of said grass cutting mechanism, a grass catching receptacle pivotally carried by said supporting means in a position forwardly of the grass cutting mechanism, a guiding handle projecting rearwardly from said mower frame, a lever fulcrumed on the guiding handle, and rigid connecting means between said lever and the receptacle for causing pivotal movement of the receptacle independently of the supporting means therefor to dump the contents of said receptacle.

3. In combination, a mower having a frame provided with grass cutting mechanism, supporting means extending forwardly of said grass cutting mechanism, a grass catching receptacle having its forward portion pivotally connected to a forward portion of the supporting means and having its rear portion normally engageable with the mower frame, a guiding handle in connection with the rear of the mower frame, and means operable from a position adjacent the guiding handle for causing pivotal movement of the receptacle independently of the supporting means therefor and in a direction away from the grass cutting mechanism to dump the contents of said receptacle.

4. In combination, a mower having a frame provided with grass cutting mechanism, supporting means extending forwardly of said grass cutting mechanism, a grass catching receptacle having its forward portion pivotally connected to a forward portion of the supporting means and having its rear portion normally engageable with the mower frame, a guiding handle in connection with the rear of the mower frame, a lever operable from a position adjacent the guiding handle, and a rod having one end pivotally connected to said lever and having its other end pivotally connected with the receptacle, said lever and rod being movable to cause dumping movement of the receptacle independently of the supporting means and in a direction away from the grass cutting mechanism.

5. In combination, a mower having a frame provided with grass cutting mechanism, supporting means extending forwardly of said grass cutting mechanism, a grass catching receptacle having its forward portion pivotally connected to a forward portion of the supporting means and having its rear portion normally engageable with the mower frame, a guiding handle in connection with the rear of the mower frame, means operable from a position adjacent the guiding handle for causing pivotal movement of the receptacle independently of the supporting means therefor and in a direction away from the grass cutting mechanism to dump the contents of said receptacle, and stop means for limiting the movement of the receptacle in a dumping direction.

6. In combination, a mower having a frame provided with grass cutting mechanism, supporting means extending forwardly of said grass cutting mechanism, a grass catching receptacle having its forward portion pivotally connected to a forward portion of the supporting means and having its rear portion normally engageable with the mower frame, a guiding handle in connection with the rear of the mower frame, means operable from a position adjacent the guiding handle for causing pivotal movement of the receptacle independently of the supporting means therefor and in a direction away from the grass cutting mechanism to dump the contents of said receptacle, and a stop carried by said receptacle and engageable with the supporting means therefor to limit movement of the receptacle in dumping direction.

7. In combination, a mower having a frame provided with grass cutting mechanism, supporting means extending forwardly of said grass cutting mechanism, a grass catching receptacle having its forward portion pivotally connected to a forward portion of the supporting means and having its rear portion normally engageable with the mower frame, a guiding handle in connection with the rear of the mower frame, a lever operable from a position adjacent the guiding handle, and a rod having one end pivotally connected to said lever and having its other end connected to the receptacle in a position spaced below the pivotal connection of the receptacle with the supporting means therefor, said arrangement providing for movement of the lever rearwardly and forwardly to cause dumping of the receptacle and for a similar movement to return the receptacle to normal position.

HARRY W. BOLENS.